United States Patent [19]

Kochmann et al.

[11] Patent Number: 4,872,030
[45] Date of Patent: Oct. 3, 1989

[54] DEVICE FOR PRODUCING PHOTOGRAPHIC EXPOSURE OF IMAGES APPEARING ON THE SCREEN

[75] Inventors: Heike Kochmann, Siegsdorf; Georg Lechner, Aying; Jürgen Müller; Norbert Scholz, both of Munich, all of Fed. Rep. of Germany

[73] Assignee: Agfa-Gevaert AG, Leverkuchen, Fed. Rep. of Germany

[21] Appl. No.: 230,188

[22] Filed: Aug. 8, 1988

[30] Foreign Application Priority Data

Aug. 29, 1987 [DE] Fed. Rep. of Germany ....... 8711745

[51] Int. Cl.⁴ .......................... G03B 5/04; G03B 9/08; G03B 29/00
[52] U.S. Cl. ....................................... 354/76; 355/54; 354/123
[58] Field of Search .................. 355/54, 55, 20, 7, 14, 355/36, 67, 46, 68; 358/244; 346/110 R; 250/203 CT; 354/14, 18, 120, 121, 122, 123, 76, 234, 111

[56] References Cited

U.S. PATENT DOCUMENTS 4,174,895 11/1979 Fermaglich et al. ........... 354/123 X
4,240,729 12/1980 Barney ................................. 354/76

FOREIGN PATENT DOCUMENTS 8504399 12/1982 Fed. Rep. of Germany .
2936228 5/1985 Fed. Rep. of Germany .

Primary Examiner—L. T. Hix
Assistant Examiner—Khanh Dang
Attorney, Agent, or Firm—Michael J. Striker

[57] ABSTRACT

A device for producing photographic exposures of images appearing on an image screen onto a film platform carrying a plane film comprises a support holding a number of objectives and displaceable parallel to the axis extending through the central point of the image screen and the central point of the film platform. The platform carries one objective fixed to the platform of one magnifying property and four additional objectives which have such magnifying properties that each of them projects the picture field area of the screen on only one fourth of the usable film surface.

5 Claims, 1 Drawing Sheet

DEVICE FOR PRODUCING PHOTOGRAPHIC EXPOSURE OF IMAGES APPEARING ON THE SCREEN

BACKGROUND OF THE INVENTION

The present invention relates to a device for producing photographic exposures of images of different size and arrangement, preferably X-ray or UV or the like images which appear on an image screen, whereby an image field area, in which images being exposed are positioned, preferably the image screen, and the film platform which is loaded with a plane film of a given useable plane film surface have a constant position relative to each other, and a plurality of objectives are positioned therebetween in different positions.

Devices of the type under consideration have been known. One of such devices has been disclosed in DE-PS 29 36 228. In this conventional device, different objective plates each provided with a various number of objectives are positioned in the image exposure device in the waiting position outside the optical ray path. Each of such plates is provided with an adjustment drive for the aligned positioning along the optical axis of the ray path, and a further adjustment drive is connected in parallel with the first mentioned adjustment drive for changing the distance from the image screen to the exposure position of the plane film. Four or nine exposures on one plane film can be selectively produced in this conventional device. The device, however, due to the great number of adjustment drives and different plates is quite costly and space-consuming due to the necessity to place the plates in the waiting position.

It is also known in commercially available monitor exposure cameras that, for example four exposures could be produced on one plane film, whereby the position of the film platform is respectively changed. This also involves considerable expenses because the displacements of the film platform must be performed with an extreme precision.

A vertical plane film platform as well as the suitable housing, light-tight bellows between the image screen, objective support and the film platform used for such cameras, have been disclosed, for example in DE-GMS 85 04 399.

SUMMARY OF THE INVENTION

It is an object of the present invention to provide an improved device for producing exposures of screen images.

It is another object of the invention to provide a device which would enable the production of four images, selectively, one after another, on the plane film and which would be less expensive and less spatious than the conventional devices of the foregoing type.

These and other objects of the invention are attained by a device for producing photographic exposures of different sizes and arrangements of X-ray, UV or the like images appearing on an image screen, comprising a film platform which is loadable with flat films of given usable flat film surfaces; a plurality of objectives positionable in different positions, wherein an image field area in which images being exposed lie, is provided in said image screen, and said image screen and said film platform have a constant position relative to each other, and said objectives are positioned between said image screen and said film platform; a support for supporting said objectives and displaceable parallel to an axis which extends between a central point formed by central lines of said image field area, a central point of said platform and a central point of a plane film surface on said film platform, said plurality of objectives including a first objective with a magnification by which, with a focus adjustment on said flat film surface, said image field area is projected onto the entire usable flat film surface, said first objective and an optical axis thereof being fixed in said support, said plurality of objectives further including four additional objectives fixed in said support and having one with another the same magnifying value being dimensioned so that each of said additional objectives projects the image field area of said screen during the focus adjustment only on one fourth of the usable flat film surface.

The device may further include means to displace said support, said means including helical thread means (10) and a non-rotatable counter thread piece (11) cooperating with said helical thread means and provided on said platform, and an electric step motor for driving said thread piece to selectively displace said support to two different positions for a focus adjustment of said first objective or said four additional objectives.

The device may include a selecting keyboard and an electric control circuit with a switch connected to said step motor, said keyboard being actuated for selecting one of focus adjustment possibilities and including a first key for actuating said motor in one direction of rotation and a second key for actuating said motor in another direction of rotation, said motor being poled for a step number required only for duration until said support has reached a respective another focus adjustment position.

The device may further include step-by-step electromagnets and locking plates actuated by said electromagnets, each of said objectives being coupled with a respective locking plate.

The keyboard may further include a locking key for energizing said electromagnets with each key actuation, said keys of said keyboard being linked by said electric control circuit such that during the focus adjustment of said first objective by said locking key only one electromagnet is energized to actuate one locking plate and during the focus adjustment of said additional objectives with each actuation of said locking key an electromagnet of other locking plates of said additional objectives is energized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The sole FIGURE of the drawing is a schematic perspective, partially broken view of the device according to the invention.

DETAILED DESCRIPTION OF THE PREFERRED EMBODIMENT

Figure 1:
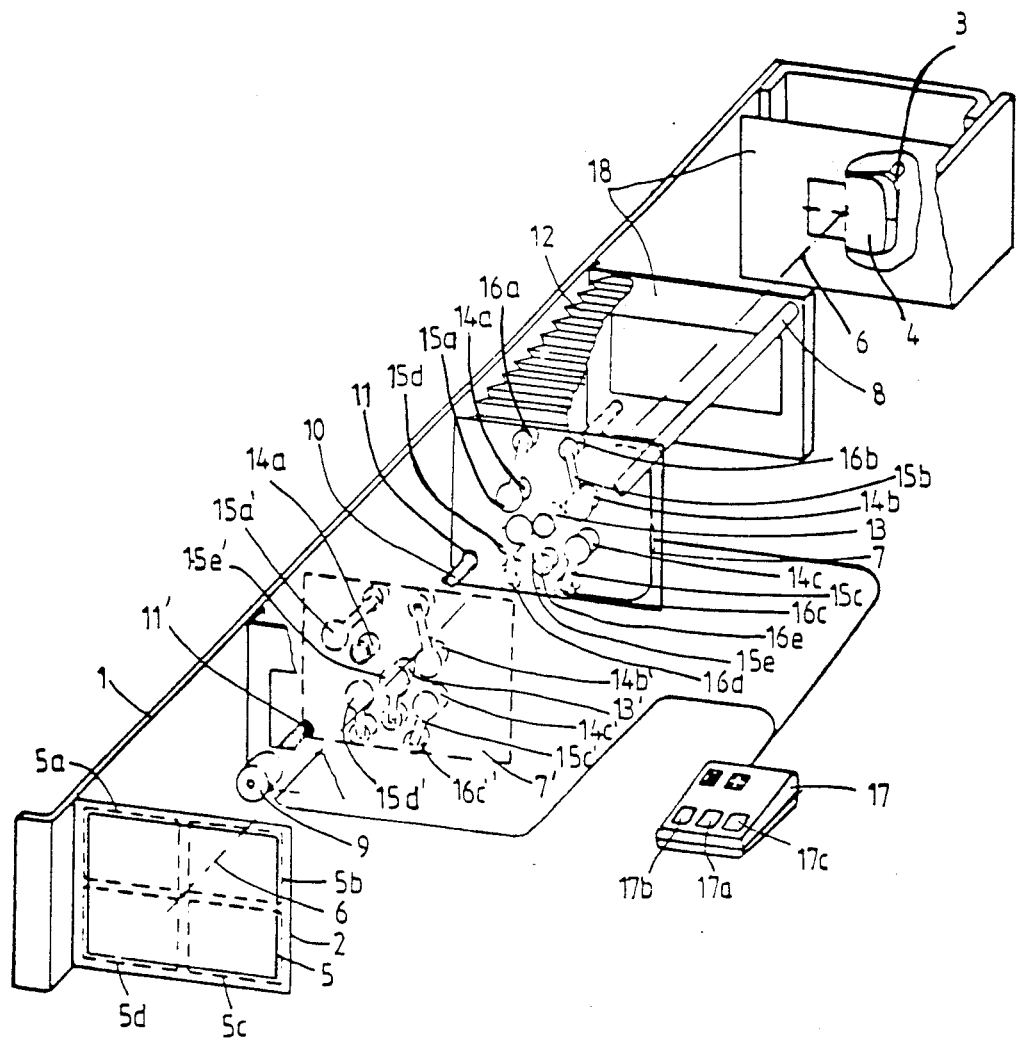

Referring now to the drawing in detail it will be seen that the device according to the invention includes a monitor camera including a housing 1. Reference numeral 2 designates a schematically shown flat film platform or window 2 positioned at one end of the housing 1. A monitor 3 with a projection screen 4 is positioned at the opposite end of housing 1. The structure of components 1 to 4 is known and has been disclosed, for example in DE-GMS 85 04 399. Above film platform 2, can be provided a device for the insertion and removal of a flat film into and from the film platform. The film inserted in the platform is denoted by reference numeral 5. The film may be exposed so that an image of the projection screen 4 would be projected to the entire usable film surface 5, or four equal images 5a to 5d of the projection screen 4 one after another and exposed, as shown by dotted lines. Thereby the central point of the projection screen, which is the point of intersecting of axial lines or diagonals of the screen, and the central point of the film, which is the point of intersection of the film diagonals are positioned on a common axis 6 at a constant distance from each other.

An objective support 7, which is formed substantially as a plate, is displaceable between the projection screen 4 and the film platform 2 or film 5 in the housing 1, for example on at least one guiding rod 8 and a threaded spindle 10 which is rotated by a step motor 9 and by which a spiral or helix 11 in plate 7 is engaged. Upon the rotation of the threaded spindle 10, the support 7 of the objective is displaced along the axis 6. Between diaphragms or light stops 18 positioned in front of the projection screen 4, and objective support 7 or its holder, is provided a removable light-tight bellows 12 shown only partially which prevents any stray light from passing from projection screen 4 to the flat film 5.

A first objective 13 is positioned in the objective support 7 with its optical distance on the axis 6. Objective 13 is calculated so that in the first position, in which the whole picture screen image is projected on the entire usable plane film surface 5, simultaneously, a focused projection of this picture screen image is produced on the plane film surface 5. On the diagonals of the objective support plate 7 extending through the axis 6, are positioned symmetrically to the axis 6, four identical objectives 14a to 14d which are rigidly supported in the objective support plate 1. These four further objectives are calculated or dimensioned so that each projects one fourth of the image on the fourth respective part of the usable film surface so as to project the four images 5a to 5d on the flat film 5 one after another. The second position of the objective support 7, in which objectives 14a to 14d project each picture screen image sharply onto one fourth of the flat film surface one next to another, will differ from the first position in which the well-focused projection is obtained by the first objective 13, by the whole predetermined length of travel. This second position is shown by broken line and all the reference numerals in this position are added with "'". Locking plates 15a to 15e each corresponds to each objective or lens 13, 14a–14d, respectively. Locking plates 15a to 15e are each pivotable by respective step-by step electromagnets 16a to 16e towards the position of exposure for their duration. The step-by-step or rotary electromagnets 16a to 16e and an electric step motor 9 are connected to an electric circuit which is enclosed in a switch box 17 with keys 17a to 17c.

If kay 17a is actuated the non-shown but conventional motor switch is poled so that the step motor 9 can rotate only in the direction in which the displacement of the objective support 7 from the position shown in solid line to the position 7' is possible just by the number of the motor steps which are required for the displacement of the objective support from the position 7. If the objective support has already taken the position 7' no rotation of the motor 9 is possible.

If key 17b is actuated an even step number of the rotation of the motor is obtained to move the objective support 7 from the position 7' back to the position 7. If the objective support is in the position 7 no adjustment is carried out.

An electric control device is designed in a conventional fashion so that upon the actuation of the third key 17c for releasing and/or locking the rotary magnets 16a to 16e in the first position for the reception of the magnet 16e with the first objective 13, the locking plate 15 corresponding to the objective 13 is energized. If the objective support is now in the position 7' one of the rotary magnets 16a' to 16d' becomes energized with each actuation of the releasing key 17c, and in a predetermined succession; for example magnets 16a', 16b', 16c' and 16d' are energized, the successive order, so that after this development, the images, with consideration of four images 5a to 5e, are indicated on the plane film 5 in such succession, in which the images are produced. This is particularly important for diagnostic purposes.

It is, of course, understandable that any other embodiments of the invention are possible. For example, in place of the helically threaded spindle 10 with a helical path 11 in support 7, a gear-rack drive or a cable drive could be utilized. Also possible to adjust the objective support or plate 7 by hand or by any suitable conventional means. Two slide-in units can be provided and the support carrying five lens or objectives could be selectively inserted in each slide-in unit. Since the objective support can remain in the respective slide-in unit until the other slide-in unit is to be used no additional space for such an embodiment would be required. Also, no adjustment drive would be necessary.

It will be understood that each of the elements described above, or two or more together, may also find a useful application in other types of devices for producing photographic exposures of different sizes differing from the types described above.

While the invention has been illustrated and described as embodied in a device for producing photographic exposures of different sizes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A device for producing photographic exposures of different sizes and arrangements of X-ray, UV or the like images appearing on an image screen, comprising a film platform which is loadable with flat films of given usable film surfaces; a plurality of objectives positionable in different positions, wherein an image field area, in which images being exposed lie, is provided by said image screen, said image screen and said film platform having a constant position relative to each other, said objectives being positioned between said image screen and said film platform; a support for supporting said objectives and displaceable parallel to an axis which extends between a central point formed by central lines of said image field area, a central point of said platform and a central point of a plane film surface on said film platform, said plurality of objectives including a first objective with a magnification by which, with a focus adjustment on said film surface, said image field area is projected into the entire usable film surface, said first objective and an optical axis thereof being fixed in said support, said plurality of objectives further including four additional objectives fixed in said support and having one with another the same magnifying value being dimensioned so that each of said additional objectives projects the image field area of said screen during the focus adjustment only on one fourth of the usable film surface.

2. The device as defined in claim 1, further including means to displace said support, said means including helical thread means (10) and a non-rotatable counter thread piece (11) cooperating with said helical thread means and provided on said platform, and an electric step motor for driving said thread piece to selectively displace said support to two different positions for a focus adjustment of said first objective or said four additional objectives.

3. The device as defined in claim 2, further including a selecting keyboard and an electric control circuit with a switch connected to said step motor, said keyboard being actuated for selecting one of focus adjustment possibilities and including a first key for actuating said motor in one direction of rotation and a second key for actuating said motor in another direction of rotation, said motor being poled for a step number required only for a duration until said support has reached a respective another focus adjustment position.

4. The device as defined in claim 3, further including rotary electromagnets and locking plates actuated by said electromagnets, each of said objectives being coupled with a respective locking plate.

5. The device as defined in claim 4, further including a locking key for energizing one of said electromagnets with each key actuation, said keys of said keyboard being linked by said electric control circuit such that during the focus adjustment of said first objective by said locking plate and during the focus adjustment of said additional objectives with each actuation of said locking key an electromagnet of other locking plates of said additional objectives is energized.

* * * * *